(12) United States Patent
Su

(10) Patent No.: US 8,793,782 B1
(45) Date of Patent: Jul. 29, 2014

(54) ENFORCING A HEALTH POLICY IN A LOCAL AREA NETWORK

(75) Inventor: Jin Su, Sandy, UT (US)

(73) Assignee: Crimson Corporation, Dover, DE (US)

( * ) Notice: Subject to any disclaimer, the term of this patent is extended or adjusted under 35 U.S.C. 154(b) by 641 days.

(21) Appl. No.: 12/789,283

(22) Filed: May 27, 2010

(51) Int. Cl.
*H04L 29/06* (2006.01)
*H04L 9/32* (2006.01)

(52) U.S. Cl.
CPC .......... *H04L 63/0807* (2013.01); *H04L 9/3213* (2013.01)
USPC ................... 726/12; 726/13; 726/15; 726/16; 726/17; 726/18; 713/153; 713/154; 713/155; 713/163

(58) Field of Classification Search
CPC .......................... H04L 63/0807; H04L 9/3213
USPC ........................................................ 726/12
See application file for complete search history.

(56) References Cited

U.S. PATENT DOCUMENTS

| | | | |
|---|---|---|---|
| 2003/0014668 A1* | 1/2003 | Faccin et al. | 713/201 |
| 2003/0041136 A1* | 2/2003 | Cheline et al. | 709/223 |
| 2006/0236383 A1* | 10/2006 | Cam-Winset et al. | 726/8 |
| 2007/0111798 A1* | 5/2007 | Robb et al. | 463/42 |

OTHER PUBLICATIONS

Aboda, B. et al., "Extensible Authentication Protocol (EAP)," Internet Engineering Task Force Request for Comments: 3748 (RFC3748), Jun. 2004, http://www.ietf.org/rfc/rfc3748.txt, Jul. 2010.
Rigney, C. et al., "Remote Authenitcation Dial in User Service (RADIUS)," Internet Engineering Task Force Request for Comments: 2865 (RFC2865), Jun. 2000, http://www.ietf.org/rfc/rfc2865.txt, Jul. 2010.
"IEEE Standard for Local and Metropolitan Area Networks Port-Based Network Access Control," IEEE Std 802.1X-2004 (Revision of IEEE Std 802.1X-2001), pp. 1-169, 2004.

* cited by examiner

*Primary Examiner* — Longbit Chai
(74) *Attorney, Agent, or Firm* — Austin Rapp & Hardman

(57) ABSTRACT

A method for injecting a security token into an authentication protocol response is disclosed. An authentication protocol response from a node requesting access to a network is intercepted. It is determined if the node complies with a health policy of the network. A security token is inserted into the authentication protocol response based on the compliance node.

36 Claims, 12 Drawing Sheets

ENFORCING A HEALTH POLICY IN A LOCAL AREA NETWORK

TECHNICAL FIELD

The present disclosure relates generally to computers and computer-related technology. More specifically, the present disclosure relates to enforcing a health policy in a local area network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. One or more servers may provide data, services and/or may be responsible for managing other computers on a network. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. This computer hardware is often upgraded and replaced with new components. Computer software is also frequently upgraded or replaced. Furthermore, computer systems may need to be scanned in order to detect and mitigate security threats.

Outside nodes may request access to computer networks. At such time, a determination may be made about the credentials of the outside node to access resources and communicate with network nodes. In addition, a network administrator may consider other factors when granting permission to outside nodes. Therefore, benefits may be realized from systems and methods for enforcing a health policy in a local area network.

DETAILED DESCRIPTION

Figure 1:
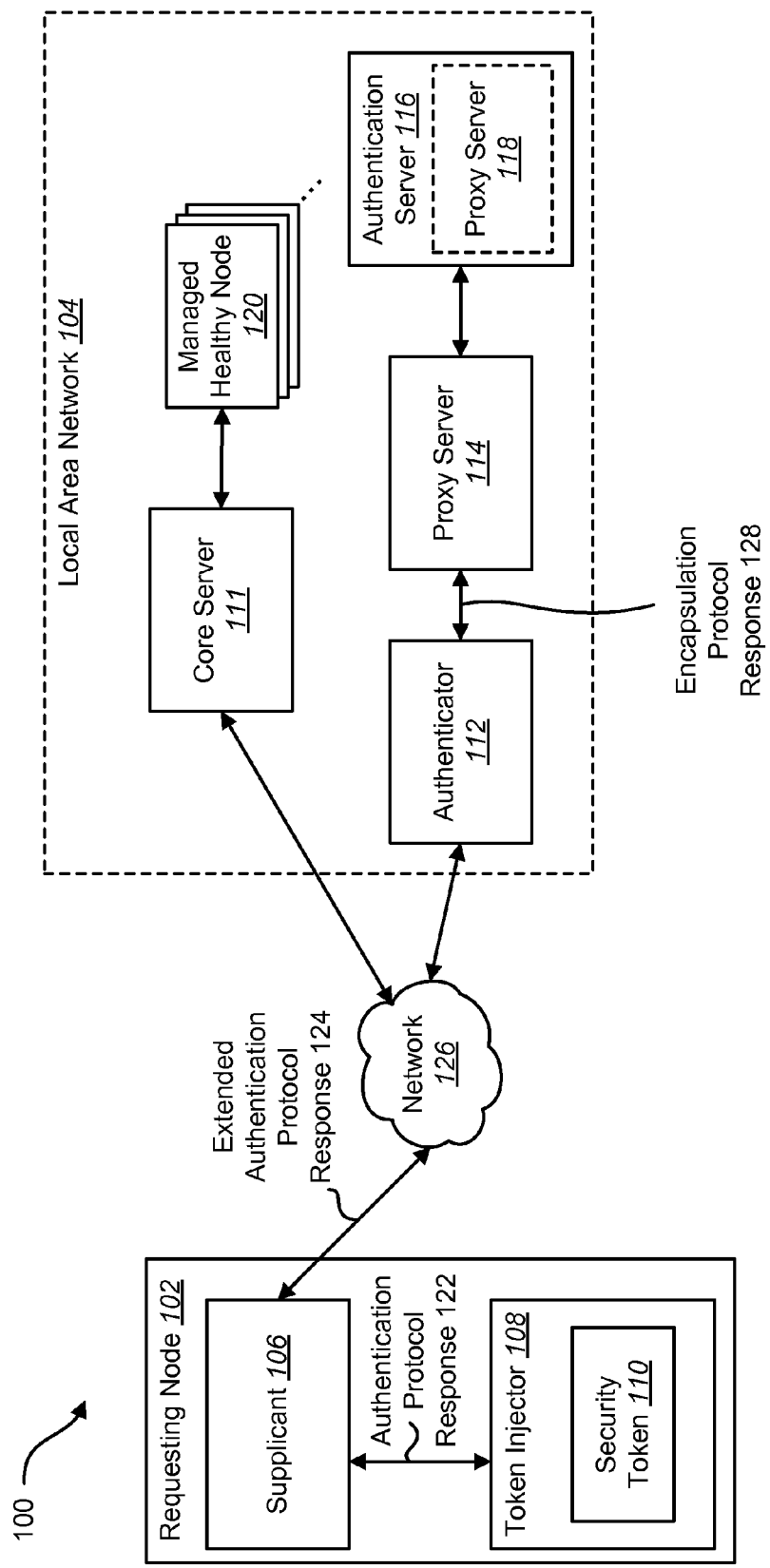
FIG. 1 is a block diagram that illustrates a system for enforcing a health policy in a local area network (LAN)

A method for injecting a security token into an authentication protocol response is disclosed. An authentication protocol response from a node requesting access to a network is intercepted. It is determined if the node complies with a health policy of the network. A security token is inserted into the authentication protocol response based on the compliance node.

In one configuration, the inserting may include unconditionally inserting the security token where a value within the security token indicates whether the node complies with the health policy. The node may be allowed to unconditionally send the authentication protocol response with the security token to an authenticator.

In another configuration, the inserting may include conditionally inserting the security token only if the node complies with the health policy. The node may be allowed to send the authentication protocol response to an authenticator only if the security token is inserted. The authentication process may be terminated if the node does not comply with the health policy. The authentication protocol response may be an Extensible Authentication Protocol (EAP) response.

A computing device that is configured for injecting a security token into an authentication protocol response is also disclosed. The computing device includes a processor and memory in electronic communication with the processor. Executable instructions are stored in the memory. The instructions are executable to intercept an authentication protocol response from a node requesting access to a network. The instructions are also executable to determine if the node complies with a health policy of the network. The instructions are also executable to insert a security token into the authentication protocol response based on the compliance of the node.

A non-transitory tangible computer-readable medium for injecting a security token into an authentication protocol response is also disclosed. The computer-readable medium includes executable instructions for intercepting an authentication protocol response from a node requesting access to a network. The computer-readable medium also includes executable instructions for determining if the node complies with a health policy of the network. The computer-readable medium also includes executable instructions for inserting a security token into the authentication protocol response based on the compliance of the node.

A method for forwarding an encapsulation protocol access request is also disclosed. An encapsulation protocol access request is received from an authenticator. It is determined whether the access request includes a security token that indicates a requesting node complies with a health policy. The encapsulation protocol access request is forwarded to an authentication server based on the determination.

In one configuration, the encapsulation protocol access request may be forwarded to the authentication server if a security token in the access request indicates that a requesting node complies. Alternatively, an encapsulation protocol access reject message may be generated and sent to the authenticator if a security token is not included in the access request or a security token is included that indicates non-compliance of the requesting node.

Furthermore, an encapsulation protocol access challenge may be received from the authentication server and forwarded to the authenticator. The encapsulation protocol access request may be a Remote Authentication Dial In User Service (RADIUS) Access-Request message.

A computing device that is configured for forwarding an encapsulation protocol access request is also disclosed. The computing device includes a processor and memory in electronic communication with the processor. Executable instructions are stored in the memory. The instructions are executable to receive an encapsulation protocol access request from an authenticator. The instructions are also executable to determine whether the access request includes a security token that indicates a requesting node complies with a health policy. The instructions are also executable to forward the encapsulation protocol access request to an authentication server based on the determination.

A non-transitory tangible computer-readable medium for forwarding an encapsulation protocol access request is also disclosed. The computer-readable medium includes executable instructions for receiving an encapsulation protocol access request from an authenticator. The computer-readable medium also includes executable instructions for determining whether the access request includes a security token that indicates a requesting node complies with a health policy. The computer-readable medium also includes executable instructions for forwarding the encapsulation protocol access request to an authentication server based on the determination.

IEEE 802.1x is an Institute of Electrical and Electronics Engineers (IEEE) Standard that is based on Extensible Authentication Protocol (EAP) and Remote Authentication Dial In User Service (RADIUS) protocol. IEEE 802.1x may provide port-based Network Access Control (NAC). IEEE 802.1x may also provide an authentication mechanism to devices wishing to connect to a local area network (LAN). A system using 802.1x may construct a LAN perimeter for trust access. However if an unhealthy device authenticates into the LAN, it may be harmful to other devices inside the protected perimeter. Standard 802.1x may not prevent unhealthy devices from authenticating into a network.

The present systems and methods describe a way to extend 802.1x protocols to provide a mechanism that prevents unhealthy devices from accessing an 802.1x-protected LAN. This mechanism may extend EAP to include a security token that identifies whether a device that connects to an 802.1x-enabled switch port is managed by authorized management and if the managed device complies with a health policy defined by the management. Based on this security token, during authentication process, an unmanaged device or an unhealthy supplicant request to access a protected LAN may be rejected.

This mechanism may be implemented in NAC solution of LANDesk Management Suit release 8.8 for support EAP method MD5 and release 9.0 for support both EAP MD5 and PEAP.

FIG. 1 is a block diagram that illustrates a system 100 for enforcing a health policy in a local area network (LAN) 104. A requesting node 102 may request access to the LAN 104. Since the LAN 104 may implement 802.1x, the requesting node 102 may be subjected to authentication before it is permitted to access LAN 104 resources. As part of the authentication process, the requesting node 102 may include a supplicant 106. As used herein, the term "supplicant" refers to a module that communicates with one or more modules for the purpose of gaining access to a network, i.e., authentication. In other words, the supplicant 106 may respond to an authenticator 112 to establish its credentials. The requesting node 102 may also include a token injector 108 that injects a security token 110 into an authentication protocol response 122 from the supplicant 106, e.g., an EAP response. In one configuration, the supplicant 106 is a user or client requesting authentication for the access network (e.g., LAN 104) and the token injector 108 may be in the same physical location as the supplicant 106. In this configuration, the token injector 108 may inject the security token 110 into the authentication protocol response 122 before it is sent to the authenticator 112.

The authenticator 112 may receive an extended authentication protocol response 124 from the supplicant 106. The extended authentication protocol response 124 may be an authentication protocol response 122 that includes a security token 110, e.g., an extended EAP response with a security token 110 that indicates the health of the requesting node 102. The term "authenticator" 112 refers to a module (e.g., a switch or access point) that restricts the communication of the supplicant 106 with an authentication server 116, i.e., the authenticator 112 may verify the identity of the supplicant 106 during the authentication process. Once authentication begins, the authenticator 112 may convert messages between the authentication protocol and the encapsulation protocol and forward converted packets between the supplicant 106 and authentication server 116 via a proxy server 114. The authenticator 112 may communicate with the supplicant 106 through a network 126. The network 126 may be wired or wireless and may use any suitable protocol, e.g., Internet Protocol (IP). The authenticator 112 may receive the extended authentication protocol response 124 and produce an encapsulation protocol response 128. In one configuration, the authenticator 112 may encapsulate a received EAP Response into a Remote Authentication Dial In User Service (RADIUS) Access-Request and send it to a proxy server 114, e.g., a RADIUS proxy server.

The proxy server 114 may be a logic unit between the authenticator 112 and an authentication server 116 (e.g., RADIUS server) that filters and forwards authentication packets between the authenticator 112 and the authentication server 116 based on the security token 110. Alternatively, the proxy server 118 may reside in the authentication server 116. The proxy server 114 may determine security tokens 110, or lack thereof, in authentication packets and send the packets to the authentication server 116 based on the contents of the security token 110. In one configuration, the security token 110 may include data that indicates whether the supplicant 106 complies with a health policy of the LAN 104. Alternatively, the fact that a security token 110 is included in the authentication packet may itself indicate compliance with the health policy. The authentication server 116 may be the actual server determining whether to accept the supplicant 106 request for network access. The terms "RADIUS server" may be used interchangeably with "authentication server" herein. After successful authentication, the supplicant 106 may be granted access to other LAN 104 resources, e.g., other managed healthy nodes 120. The managed healthy nodes 120 may be managed by a core server 111, e.g., a LANDesk core server.

This extended 802.1x with health policy enforcement may provide a mechanism that enforces a health policy on a managed device (e.g., the requesting node 102) by utilizing 802.1x authentication process. The present systems and methods may permit the construction of not only a trusted LAN perimeter, but also ensure a healthy LAN. It may extend 802.1x's capability of trust access to trust and health access. Another advantage may be that it can make different switches and RADIUS servers that are made by different vendors compatible with each other (as long as they support 802.1x protocols). Previously switches and servers would usually be from the same manufacturer, such as CISCO NAC and Huawei 802.1x support solutions.

Figure 2:
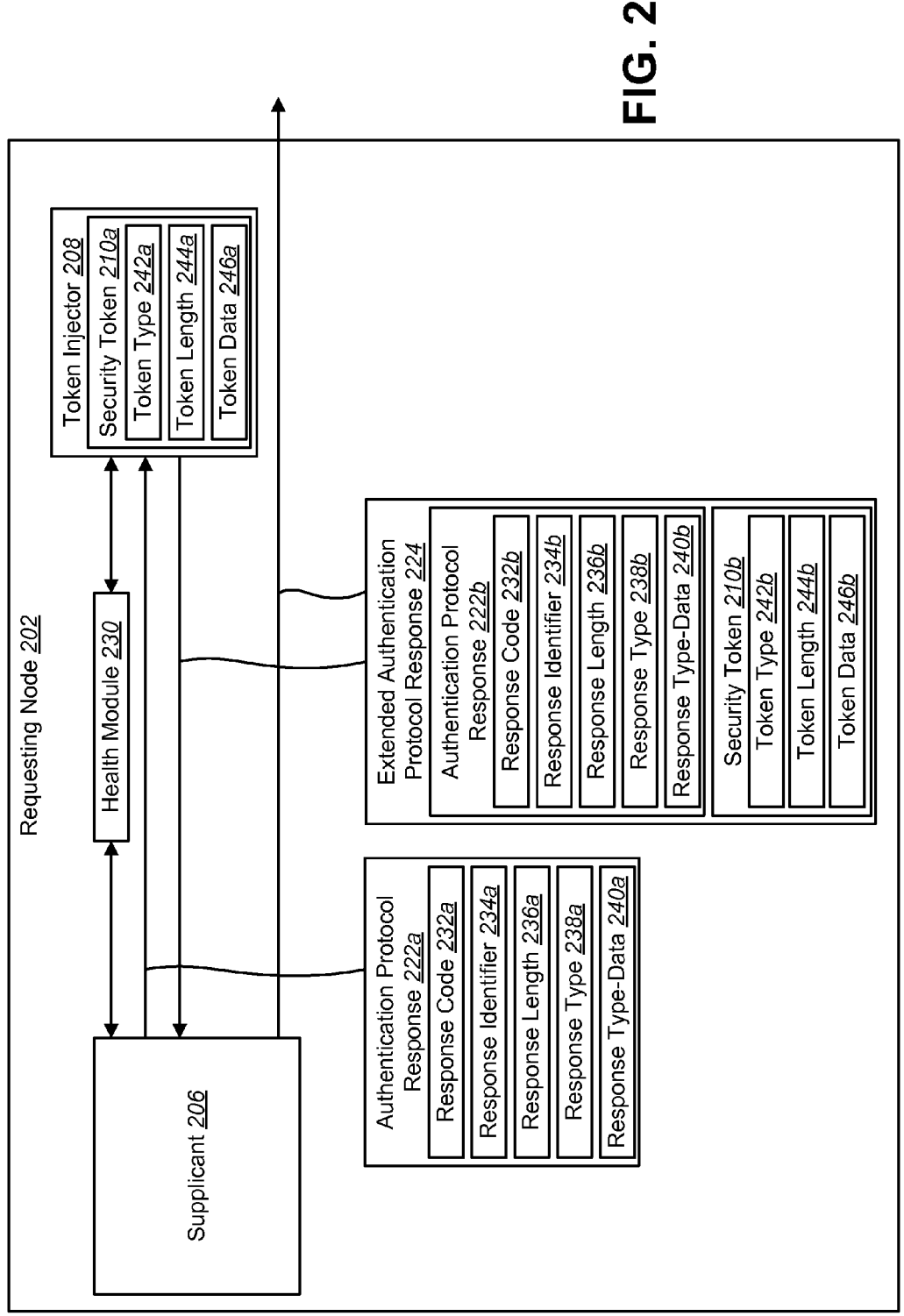
FIG. 2 is a block diagram of a requesting node.

FIG. 2 is a block diagram of a requesting node 202. The requesting node 202 may include a supplicant 206, a token injector 208, and a health module 230. The supplicant 206 may generate an authentication protocol response 222a, e.g., a standard EAP response. The authentication protocol response 222a may include a response code 232a, a response identifier 234a, a response length 236a, a response type 238a, and response type-data 240a.

In one configuration, the authentication protocol response 222a may be an EAP response message as defined in the Internet Engineering Task Force Request for Comments: 3748 (RFC3748). The response code 232a may be an octet with a value that indicates the message is a response, e.g., a value of 2 for an EAP response message. As used herein, the term "octet" refers to a grouping of eight bits. The response identifier 234a may be an octet with a value to match the authentication protocol response 222a with a corresponding authentication protocol request, i.e., from an authentication server 116. The response length 236a may use two octets to indicate the length of the authentication protocol response 222a. The response type 238a may use one octet to indicate the type of request or response. The response type-data 240a may vary with the type of response.

A token injector 208 may intercept the authentication protocol response 222a, determine the health of the supplicant 206 and inject a security token 210a based on the health of the supplicant 206 to produce an extended authentication protocol response 224. Before injecting the security token 210a, token injector 208 may determine if the device or supplicant 206 complies with a health policy. As used herein, the term "healthy" refers to compliance with a configuration condition, i.e., a device includes a required patch, a required application, is sufficiently monitored by a firewall, does not include prohibited applications, etc. Determining the health of a device may include checking a health scan result that was performed by a healthy scan tool, i.e., a health module 230. Using a previous scan result may introduce a time frame between two scans. In this time frame, a healthy device may possibly turn into an unhealthy device according to the health policy. If real time health scanning is performed, the supplicant 206 may be put into a quarantine network while the health scanning is performed. Then, if the scan result indicates compliance to the health policy, the supplicant 206 or requesting node 202 may be brought back to the regular healthy network. However, this may introduce a longer delay of device connection.

After determining the compliance to a health policy, the token injector 208 may inject a security token 210a into the authentication protocol response 222a, e.g., an EAP Response. In one configuration, the token injector 208 may always inject a security token 210a into the authentication protocol response 222a to let authentication process continue (unconditional injection), i.e., the token data 246a indicates compliance or non-compliance with the health policy. Alternatively, the token injector 208 may only inject a security token 210a when the supplicant 206 or requesting node 202 is healthy (conditional injection). In such a configuration, the security token 210a itself indicates compliance with a health policy. If the supplicant 206 or requesting node 202 is healthy, the token injector 208 may inject the security token 210a and continue authentication process. If the supplicant 206 or requesting node 202 is unhealthy, the token injector 208 may interrupt authentication process and the device may be placed into a quarantine network by an authenticator 112.

The security token 210a may include a token type 242a, a token length 244a and token data 246a. In one configuration, the security token extends an EAP response message. In this configuration, the token type 242a may use one octet to indicate how to interpret a data field 246a. The token length 244a may use one octet to indicate the length of the security token 210a. The token data 246a may be the actual information provided by the security token 210a.

Therefore, when the security token 210a is added to the authentication protocol response 222a, the token injector 208 produces an extended authentication protocol response 224. The extended authentication protocol response 224 may include an authentication protocol response 222b and a security token 210b. As before, the authentication protocol response 222b may include a response code 232b, a response identifier 234b, a response length 236b, a response type 238b and response type-data 240b. The security token 210b may include a token type 242b, a token length 244b and token data 246b. This extended protocol response 224 may be sent to an authenticator 112 by the supplicant 206.

The format of the security token 210a-b may be defined differently between the token injector 208 and a proxy server 114 as long as it provides enough information for the proxy server 114 to determine the health of the supplicant 206 or requesting node 202. In LANDesk NAC implementation, for example, the format used is Core Server Name/Identity. The response length 236b may include the token length 244b. Therefore, when the token injector 208 injects the security token 210b into the authentication protocol response 222a, it may modify response length 236b field.

Extended EAP with a security token 110 following the response type-data 240b may work especially well for some EAP methods such as EAP-MD5 since its data length in the response type-data 240b field is one octet while the response length 236b is two octets, leaving enough room for the security token 210b.

Figure 3:
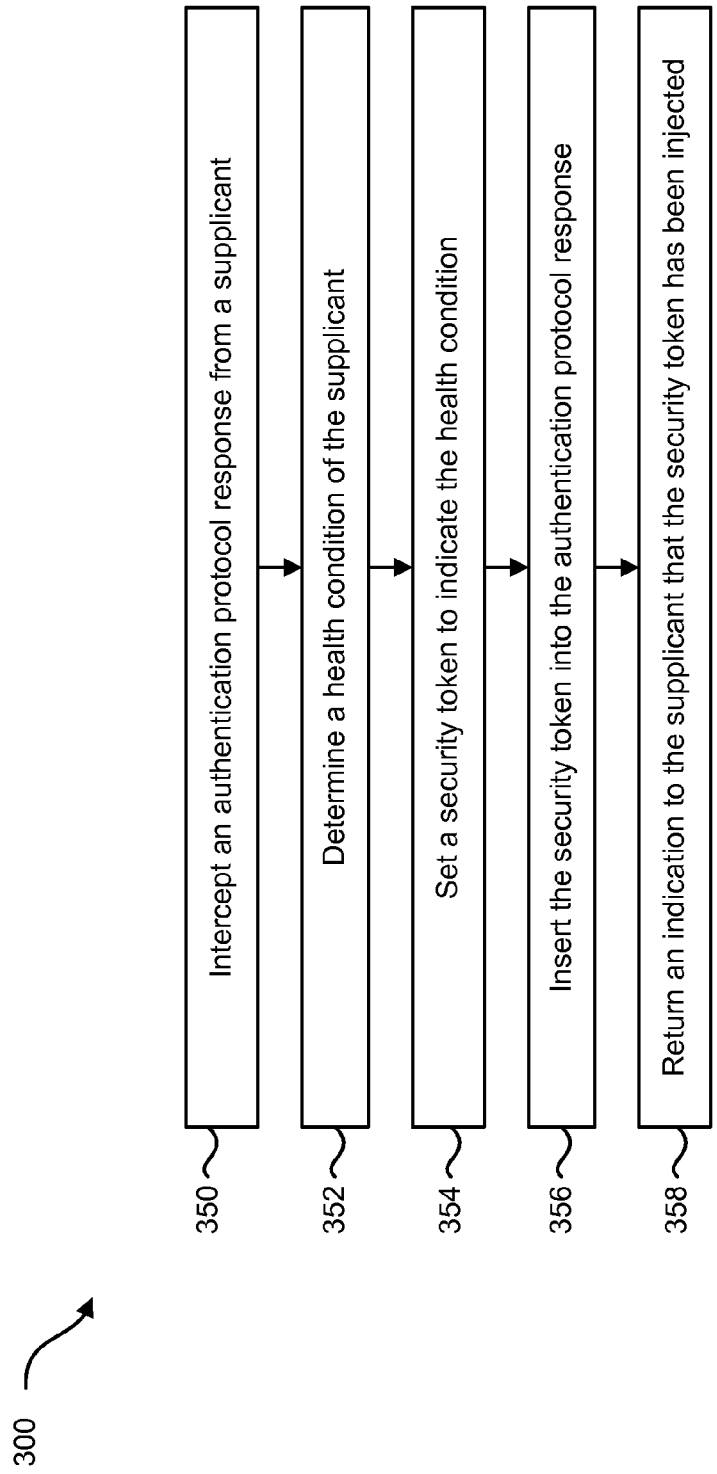
FIG. 3 is a flow diagram illustrating a method for injecting a security token into an authentication protocol response.

FIG. 3 is a flow diagram illustrating a method 300 for injecting a security token 210 into an authentication protocol response 222. The method 300 may be performed by a token injector 208. The token injector 208 may intercept 350 an authentication protocol response 222a from a supplicant 206. The authentication protocol response 222a may be intended for an authenticator 112 before it is intercepted. The token injector 208 may determine 352 a health condition of the supplicant 206. In other words, the token injector 208 may determine 352 whether the supplicant 206 or requesting node 202 complies with a health policy. This may include using a health module 230 to scan the supplicant 206 or requesting node 202, e.g., using a real-time scan or previous scan results. The token injector 208 may also set 354 a security token 210 to indicate the health condition. The token injector 208 may also insert 356 the security token 210 into the authentication protocol response 222a, i.e., to form an extended authentication protocol response 224. The method 300 may unconditionally inject a security token 210 into the authentication protocol response 222a with the token data 246 field indicating compliance or non-compliance with the health policy. The token injector 208 may also return 358 an indication to the supplicant 206 that the security token 210 has been injected.

In one configuration, the token injector 208 may inject the security token 210 during the supplicant 206 response process. The token injector 208 may operate as a function call within the requesting node 202. In other words, the token injector 208 may be called as part of the supplicant's packet build up. If the token injector 208 returns a value indicating that the security token 210 has been successfully injected, the supplicant's packet build may continue. If the token injector 208 does not return a value indicating that the security token 210 has been successfully injected, the supplicant's packet build may be interrupted. Therefore, while the token injector 208 may not itself send the extended authentication protocol response 224 to the authenticator 112, it may allow or deny the supplicant 206 to do so.

Figure 4:
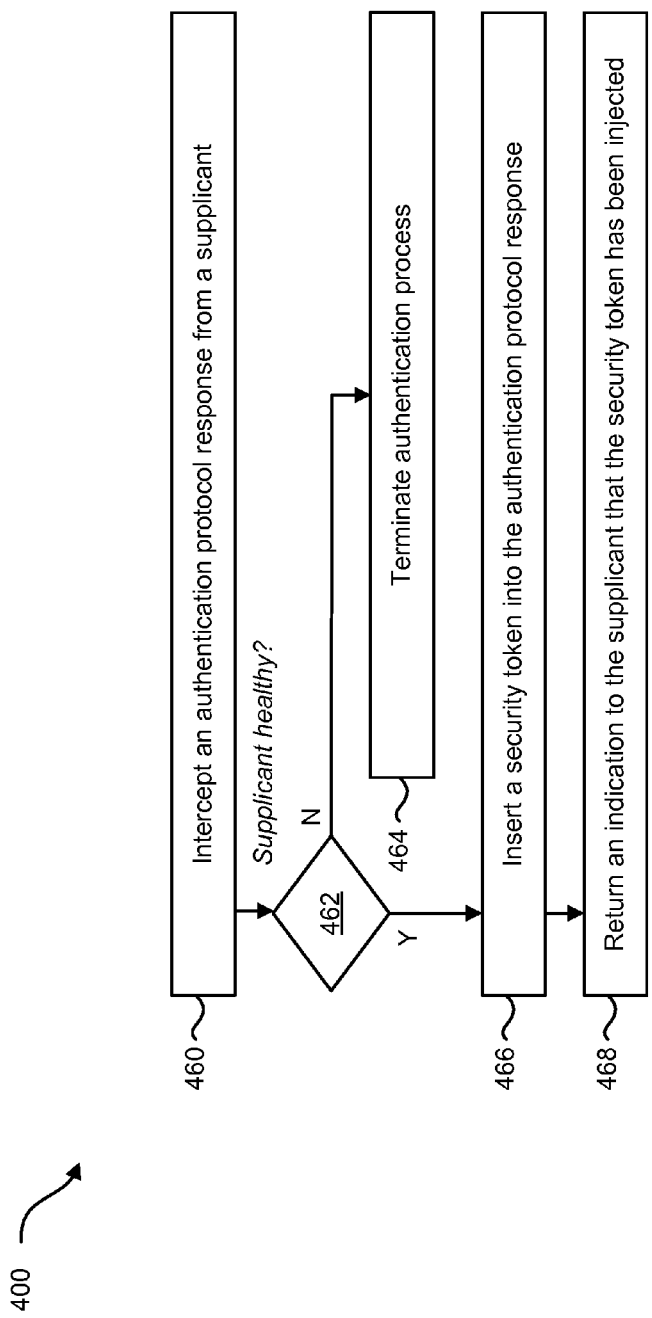
FIG. 4 is a flow diagram illustrating another method for injecting a security token into an authentication protocol response.

FIG. 4 is a flow diagram illustrating another method 400 for injecting a security token 210 into an authentication protocol response 222. The method 400 may be performed by a token injector 208. The token injector 208 may intercept 460 an authentication protocol response 222a from a supplicant 206. The authentication protocol response 222a may be intended for an authenticator 112 before it is intercepted. The token injector 208 may determine 462 if the supplicant 206 is healthy according to a health policy. In other words, the token injector 208 may determine whether the supplicant 206 or requesting node 202 complies with a health policy. This may include using a health module 230 to scan the supplicant 206 or requesting node 202, e.g., using a real-time scan or previous scan results. If the supplicant 206 or requesting node 202 is not healthy, the token injector 208 may terminate 464 the authentication process. If the supplicant 206 or requesting node 202 is healthy, the token injector 208 may insert 466 a security token 210 into the authentication protocol response 222a and return 468 an indication to the supplicant 206 that the security token has been injected. The supplicant 206 may also send 468 the authentication protocol response to an authenticator 112, i.e., an extended authentication protocol response 224 is sent. Therefore, the token injector 208 may conditionally inject the security token 210 rather than unconditionally inject the security token 210. In the conditional injection method 400, the presence of the security token 210 may indicate the health of the supplicant 206 or requesting node 202. This conditional injection may also make the security token 210 size smaller and reduce the work load for a proxy server 114.

Figure 5:
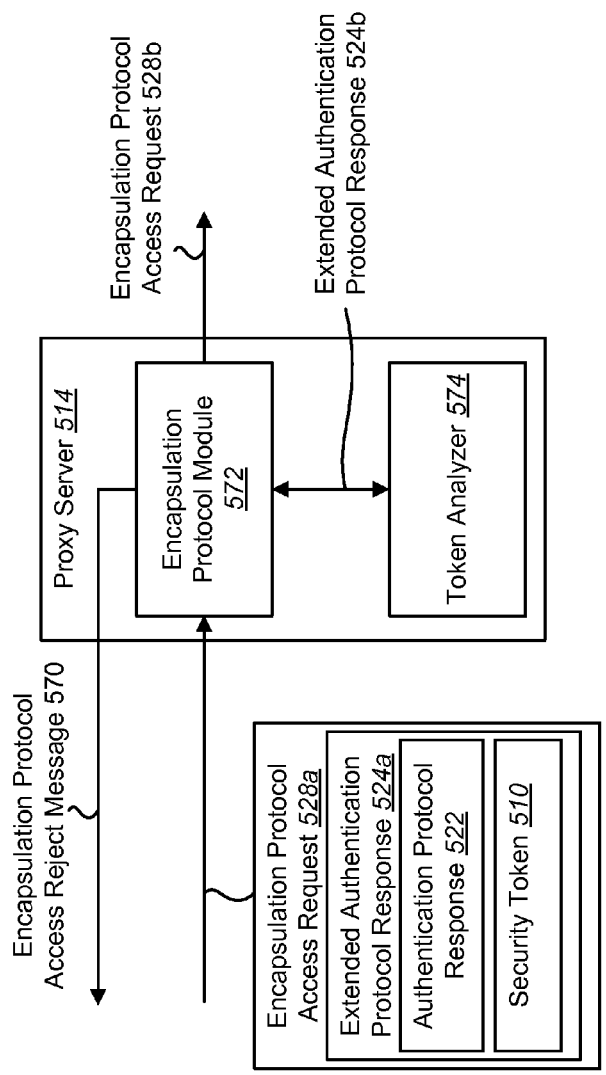
FIG. 5 is a block diagram illustrating a proxy server.

FIG. 5 is a block diagram illustrating a proxy server 514. The proxy server 514 may act as a relay between an authenticator 112 and an authentication server 116, e.g., using the RADIUS protocol as defined in RFC2865. The proxy server 514 may be a logic unit that runs in standalone hardware, resides with a RADIUS server 116 in the same hardware or as a server plug-in. The proxy server 514 may examine a security token 510 that was injected into an extended authentication protocol response 524a (along with the original authentication protocol response 522). The extended authentication protocol response 524a may be wrapped in an encapsulation protocol access request 528a, e.g., a RADIUS Request. The proxy server 514 may forward the received encapsulation protocol access request 528a to an authentication server 116 based on the security token 510.

The proxy server 514 may include an encapsulation protocol module 572 that unwraps the extended authentication protocol response 524b. In one configuration, an EAP Response may be wrapped in the RADIUS name/value pair attribute of a RADIUS Request, i.e., the EAP Response from a supplicant 106 may be converted into a RADIUS Request by an authenticator 112. After the encapsulation protocol module 572 unwraps the extended authentication protocol response 524b, a token analyzer 574 may look for a security token 510. In an unconditional injection system, the proxy server 514 may forward the encapsulation protocol access request 528b to an authentication server if a security token 510 is found and the token does not indicate an unhealthy status, e.g., a RADIUS request may be forwarded to a RADIUS server. In a conditional injection system, the proxy server 514 may forward the encapsulation protocol access request 528b to an authentication server if a security token 510 is found. If a token analyzer 574 does not find the security token 510 in the extended authentication protocol response 524b (or the security token 510 indicates an unhealthy status in an unconditional injection system), the encapsulation protocol module 572 may generate an encapsulation protocol access reject message 570 and send it to the authenticator 112 to abort the authentication process. For example, the encapsulation protocol access reject message 570 may be a RADIUS Access-Reject. An authenticator 112 may place the requesting node 102 in the quarantine network upon receiving the encapsulation protocol access reject message 570.

The proxy server 514 may share the same encryption data that is shared between the authenticator 112 and authentication server 116. To an authenticator 112, the proxy server 514 may appear to be an authentication server 116. To an authentication server 116, the proxy server 514 may appear to be an authenticator 112. The proxy server 514 may communicate with the authenticator 112 using the standard 1812/1645 port. Therefore, if the proxy server 514 is a logic unit that physically resides in the same physical hardware as the authentication server 116, the authentication server 116 may be configured to use a different port so that the RADIUS server ports at the authenticator 112 do not need to be reconfigured. If the authentication server 116 provides a call back mechanism, the proxy server 514 may be a plug-in to the authentication server 116. For example, LANDesk NAC solution provides this kind of plug-in along with a proxy server 514 option when Microsoft's Internet Authentication Service (IAS) is used as the authentication server 116 and the user chooses plug-in instead of RADIUS Proxy.

Figure 6:
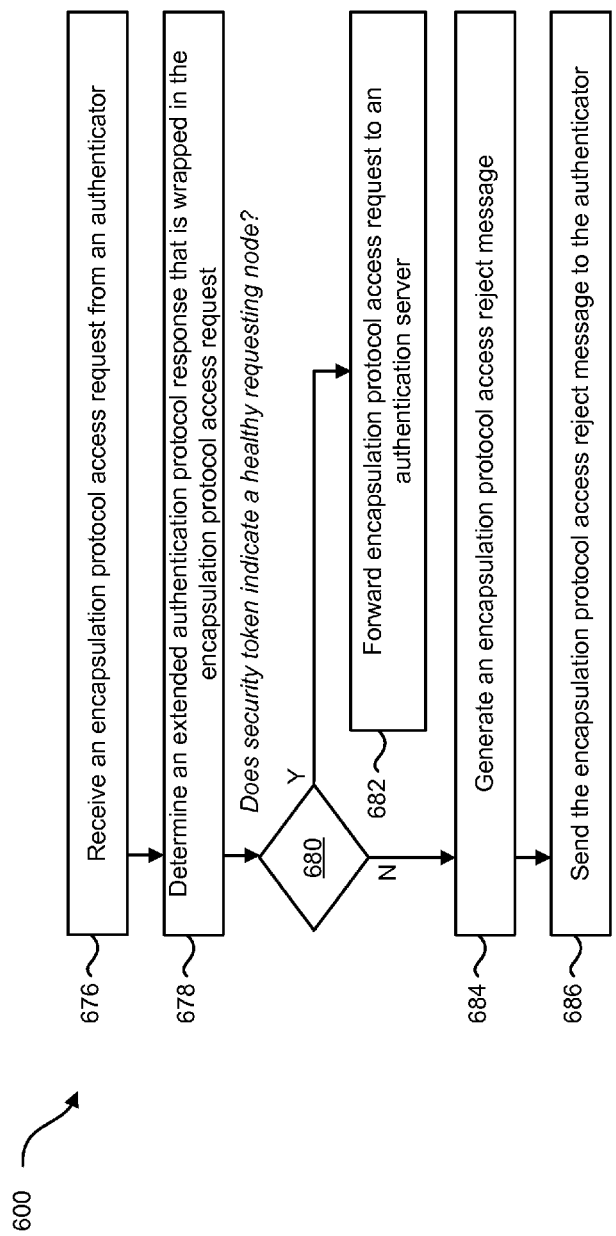
FIG. 6 is a flow diagram of a method for forwarding an encapsulation protocol access request.

FIG. 6 is a flow diagram of a method 600 for forwarding an encapsulation protocol access request 528. The method 600 may be performed by a proxy server 514, e.g., a RADIUS server. The proxy server 514 may receive 676 an encapsulation protocol access request 528 from an authenticator 112, e.g., RADIUS Access-Request. The proxy server 514 may also determine 678 an extended authentication protocol response 524 that is wrapped in the encapsulation protocol access request 528. In other words, an EAP Response may be wrapped in a RADIUS Access-Request. The proxy server 514 may also determine 680 whether a security token 510 indicates a healthy requesting node. If there is no security token 510 (in a conditional injection system) or the security token 510 indicates an unhealthy requesting node (in an unconditional injection system), the proxy server 514 may generate 684 an encapsulation protocol access reject message 570 and send 686 it to the authenticator 112, e.g., a RADIUS Access-Reject. If, however, a security token 510 indicates a healthy requesting node (by its presence in a conditional injection system or by its data in an unconditional injection system), the proxy server 514 may forward 682 the encapsulation protocol access request 528 to an authentication server 116, e.g., forward a RADIUS Access-Request to its represented RADIUS server.

The proxy server 514 may also forward encapsulation protocol access challenge messages received from an authentication server 116 to an authenticator 112. In one configuration, this may include receiving a RADIUS Access-Challenge from a RADIUS server and forwarding it to the authenticator 112.

Figure 7:
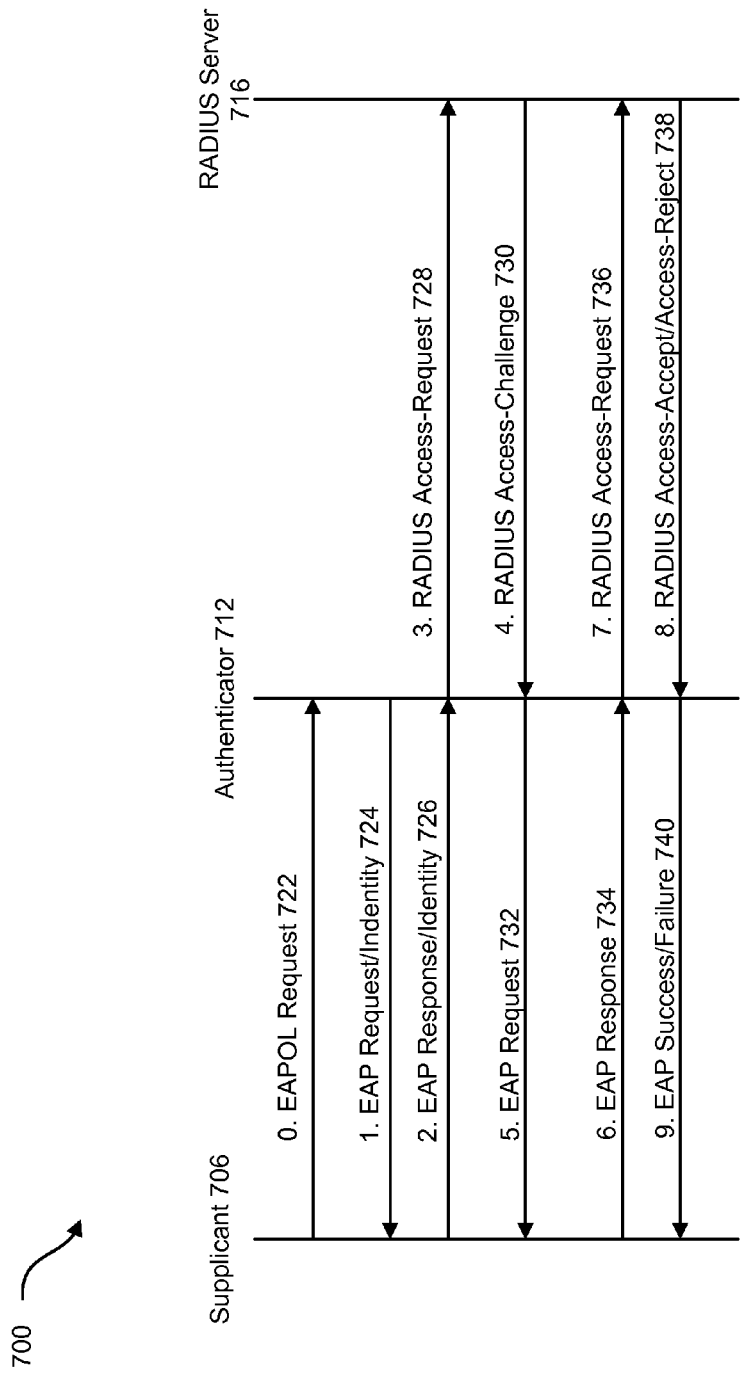
FIG. 7 is a sequence diagram illustrating one possible configuration of access signaling using an authentication protocol and an encapsulation protocol.

FIG. 7 is a sequence diagram 700 illustrating one possible configuration of access signaling using an authentication protocol and an encapsulation protocol. In this configuration, a supplicant 706 and an authenticator 712 may communicate using EAP (layer 2 protocol in 802.1x) and the authenticator 712 and a RADIUS server 716 may communicate using RADIUS (layer 3 protocol in 802.1x). When the supplicant 706 wants to connect to a network, it may use EAP OVER LAN (EAPOL) to send an EAPOL request 722 to the authenticator 712, e.g., EAPOL/Start message. This step may not be shown in subsequent sequence diagrams. The authenticator 712 may send an EAP Request/Identity message 724 to the supplicant 706. The supplicant 706 may receive the identity via a login prompt or from cache and send the identity to the authenticator 712 as an EAP Response/Identity 726 message. The authenticator 712 may convert the EAP Response/Identity 726 to a RADIUS Access-Request 728 that wraps EAP Response 726 as a RADIUS name/value pair attribute and sends it to the RADIUS server 716. The RADIUS server 716 may generate a RADIUS Access-Challenge 730 message with EAP type configured in the RADIUS server 716 for the selected authentication method as RADIUS name/value pair attribute, and then send it to the authenticator 712. The authenticator 712 may convert the RADIUS Access-Challenge 730 to an EAP Request 732 and send it to the supplicant 706. The supplicant 706 may send an EAP Response 734 that includes the credential to the authenticator 712. The authenticator 712 may convert the EAP Response 734 to a RADIUS Access-Request 736, and send it to the RADIUS server 716. For some authentication methods, such as Protected EAP (PEAP), multiple Access-Challenges 730 and Access-Requests 728 may be exchanged for information or key exchange. The RADIUS server 716 may verify the credential in the EAP Response 734 and send a RADIUS Access-Accept or Access-Reject 738 to the authenticator 712 depending on the result of the credential verification. The authenticator 712 may convert the RADIUS Access-Accept/Access-Reject 738 to EAP Success/Failure 740, and then send it to the supplicant 706 to finish the authentication process. Meanwhile, if the authenticator 712 receives an Access-Accept 738, the port may be opened. However, if the authenticator 712 receives an Access-Reject 738, the authenticator 712 may switch the port to guest virtual LAN (guest-VLAN) or default-VLAN.

Figure 8:
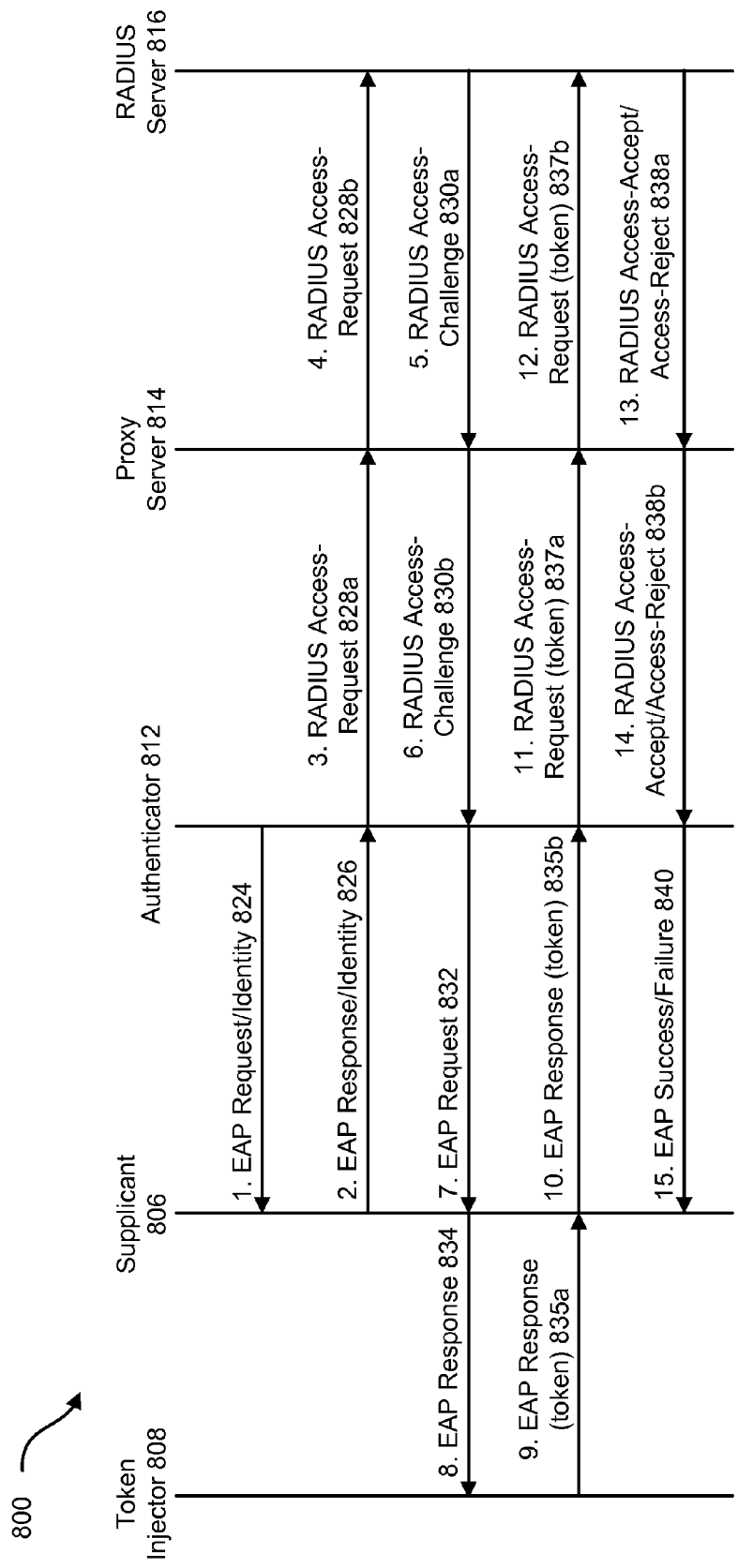
FIG. 8 is a sequence diagram illustrating another possible configuration of access signaling using an authentication protocol and an encapsulation protocol.

FIG. 8 is a sequence diagram 800 illustrating another possible configuration of access signaling using an extended authentication protocol and an encapsulation protocol. In this configuration, a supplicant 806 and an authenticator 812 may communicate using EAP (layer 2 protocol in 802.1x) and the authenticator 812, a proxy server 814 and a RADIUS server 816 may communicate using RADIUS (layer 3 protocol in 802.1x). The authenticator 812 may send a Request/Identity 824 message to the supplicant 806 after receiving an EAPOL/Start message. The supplicant 806 may receive the identity (via a login prompt or from cache), and may send the identity to the authenticator 812 as an EAP Response/Identity 826 message. The authenticator 812 may convert the EAP Response/Identity 826 to a RADIUS Access-Request 828a that includes the EAP Response/Identity 826 as a RADIUS name/value pair attribute and send the request to the proxy server 814. The proxy server 814 may forward this RADIUS Access-Request 828b to the RADIUS server 816. The RADIUS server 816 may generate a RADIUS Access-Challenge 830a with the EAP type configured in the RADIUS server 816 as the selected authentication method, and then send the RADIUS Access-Challenge 830a to the proxy server 814. The proxy server 814 may forward the RADIUS Access-Challenge 830b to the authenticator 812.

The authenticator 812 may convert the RADIUS Access-Challenge 830b to an EAP Request 832 and send it to the supplicant 806. The supplicant 806 may generate and send an EAP Response 834 that includes authentication credentials. The EAP Response 834 may be intercepted by the token injector 808 during the response build up process. The token injector 808 may check the compliance of a device (e.g., requesting node) with a health policy. In this sequence diagram 800, the result of check is fine. The token injector 808 may inject a security token into the EAP Response 834, adjust EAP Length field and allow continuing of authentication process. In other words, the sequence diagram 800 may illustrate a token injector 808 that uses unconditional injection. The supplicant 806 may send the EAP Response with security token 835a to the authenticator 812. The authenticator 812 may convert EAP Response 835b to a RADIUS Access-Request 837a, and send it to the proxy server 814. The proxy server 814 may examine the EAP Response field that is wrapped in the RADIUS Access-Request 837a for the security token. In this sequence diagram 800, the proxy server 814 finds the security token and forwards the Access-Request 837b to the RADIUS server 816. The RADIUS server 816 may verify the credential supplied by supplicant 806 in the EAP Response, generate a RADIUS-Accept 838a if the credential is correct, or generate a RADIUS-Reject 838a if verification fails, and then sends it to the proxy server 814. The proxy server 814 may forward the RADIUS Accept/Reject 838b to the authenticator 812. The authenticator 812 may convert the RADIUS Access-Accept/Access-Reject 838b to an EAP Success/Failure 840 message and send it to the supplicant 806. Meanwhile, if the authenticator 812 receives a RADIUS Access-Accept 838b, the port may be opened. However, if the authenticator 812 receives an Access-Reject 838b, the authenticator 812 may switch the port to guest-VLAN or default-VLAN.

Figure 9:
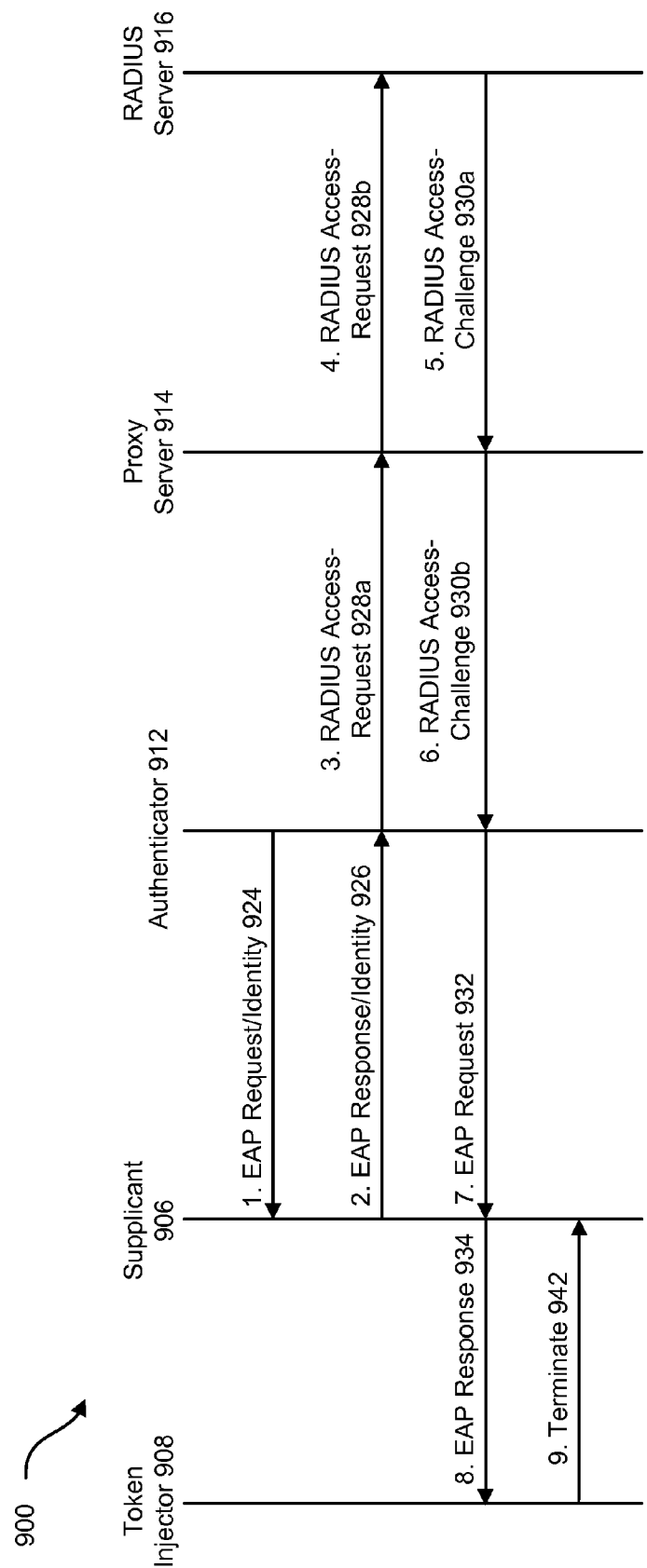
FIG. 9 is a sequence diagram illustrating another possible configuration of access signaling using an authentication protocol and an encapsulation protocol.

FIG. 9 is a sequence diagram 900 illustrating another possible configuration of access signaling using an authentication protocol and an encapsulation protocol. As with the sequence diagram 800 illustrated in FIG. 8, a supplicant 906 and an authenticator 912 may communicate using EAP and the authenticator 912, a proxy server 914 and a RADIUS server 916 may communicate using RADIUS. The first eight illustrated messages in the sequence diagram 900 may correspond to the first eight messages of the previous sequence diagram 800. In other words, the EAP Request/Identity 924, EAP Response/Identity 926, RADIUS Access-Request 928a-b, RADIUS Access-Challenge 930a-b, EAP Request 932 and EAP Response 934 in the sequence diagram 900 may correspond with the EAP Request/Identity 824, EAP Response/Identity 826, RADIUS Access-Request 828a-b, RADIUS Access-Challenge 830a-b, EAP Request 832 and EAP Response 834 in the previous sequence diagram 800.

However, after the token injector 908 intercepts the EAP Response 934, the sequence diagram 900 illustrates a configuration where the supplicant 906 is not healthy, i.e., it does not comply with a health policy of the LAN. Therefore, when the token injector 908 discovers that the supplicant 906 is unhealthy (and the token injector 908 uses conditional injection), it may terminate 942 the authentication process, which may cause the authenticator 912 to place the supplicant 906 in a quarantine network.

Figure 10:
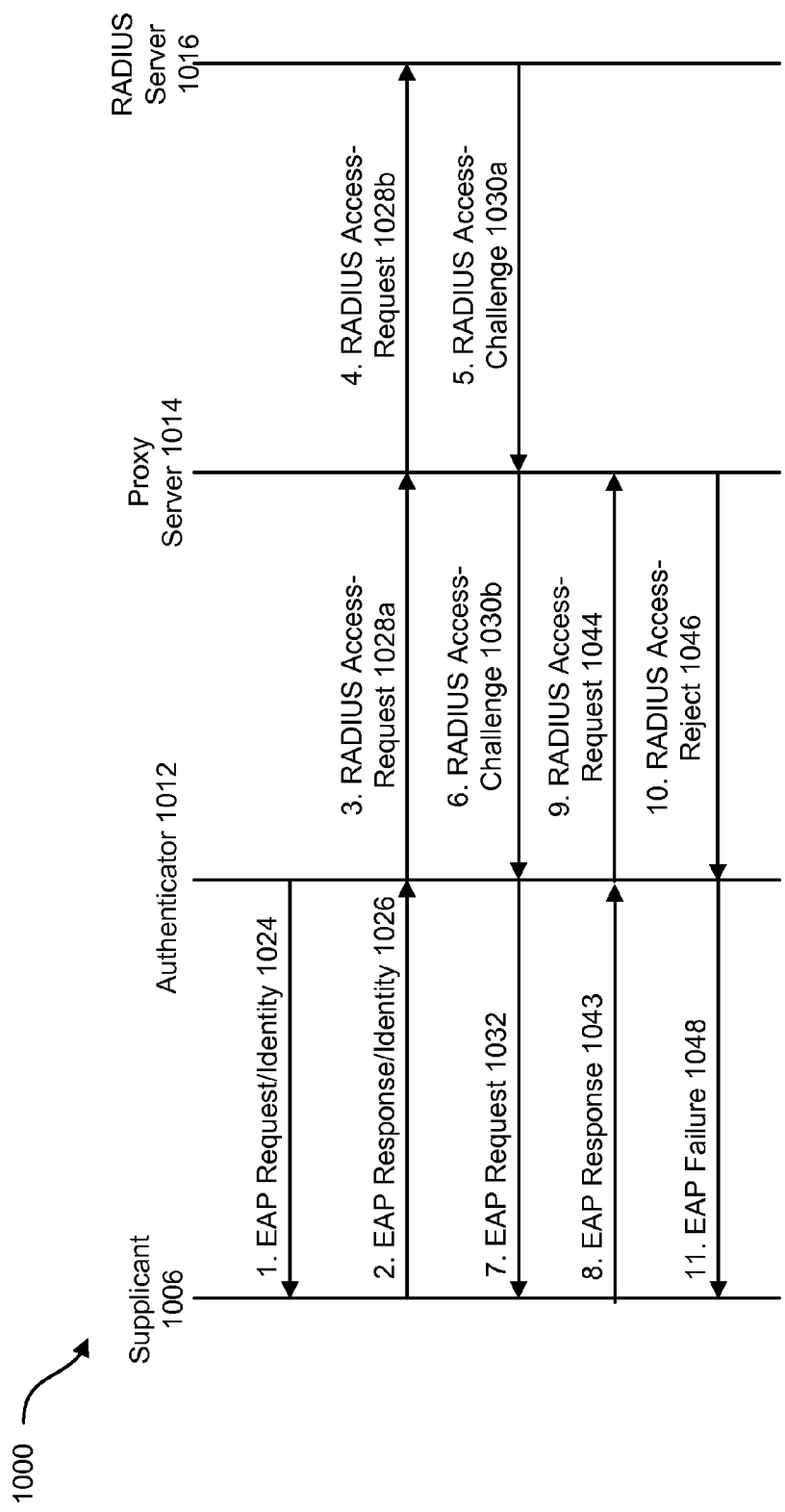
FIG. 10 is a sequence diagram illustrating another possible configuration of access signaling using an authentication protocol and an encapsulation protocol.

FIG. 10 is a sequence diagram 1000 illustrating another possible configuration of access signaling using an authentication protocol and an encapsulation protocol. In this configuration, however, the supplicant 1006 may be a non-authorized supplicant 1006, i.e., it does not include an authorized management agent. In other words, the non-authorized supplicant 1006 may not have a token injector, therefore, the authentication packet may be dropped by the proxy server 1014 and the authentication process may be interrupted. The first seven illustrated messages in the sequence diagram 1000 may correspond to the first seven messages of the previous sequence diagram 900. In other words, the EAP Request/Identity 1024, EAP Response/Identity 1026, RADIUS Access-Request 1028a-b, RADIUS Access-Challenge 1030a-b and EAP Request 1032 in the sequence diagram 1000 may correspond with the EAP Request/Identity 924, EAP Response/Identity 926, RADIUS Access-Request 928a-b, RADIUS Access-Challenge 930a-b and EAP Request 932 in the previous sequence diagram 900.

In this configuration, the non-authorized supplicant 1006 may generate and send an EAP Response 1043 to the authenticator 1012, as in a standard 802.1x system. There may not be a token injector interception as before (because the supplicant 1006 is not authorized). The authenticator 1012 may convert the EAP Response 1043 to a RADIUS Access-Request 1044 and send it to the proxy server 1014. In this configuration, the proxy server 1014 may not be able to find the security token in the EAP Response 1043 that is wrapped in RADIUS Access-Request 1044. Therefore, instead of forwarding the RADIUS Access-Request 1044 to the RADIUS server 1016, the proxy server 1016 may generate a RADIUS Access-Reject 1046 and send it to the authenticator 1012. The authenticator 1012 may convert the RADIUS Access-Reject 1046 to an EAP Failure 1048, and send it to the supplicant 1006. This may cause the authenticator 1012 to place the supplicant 1006 in a quarantine network.

Figure 11:
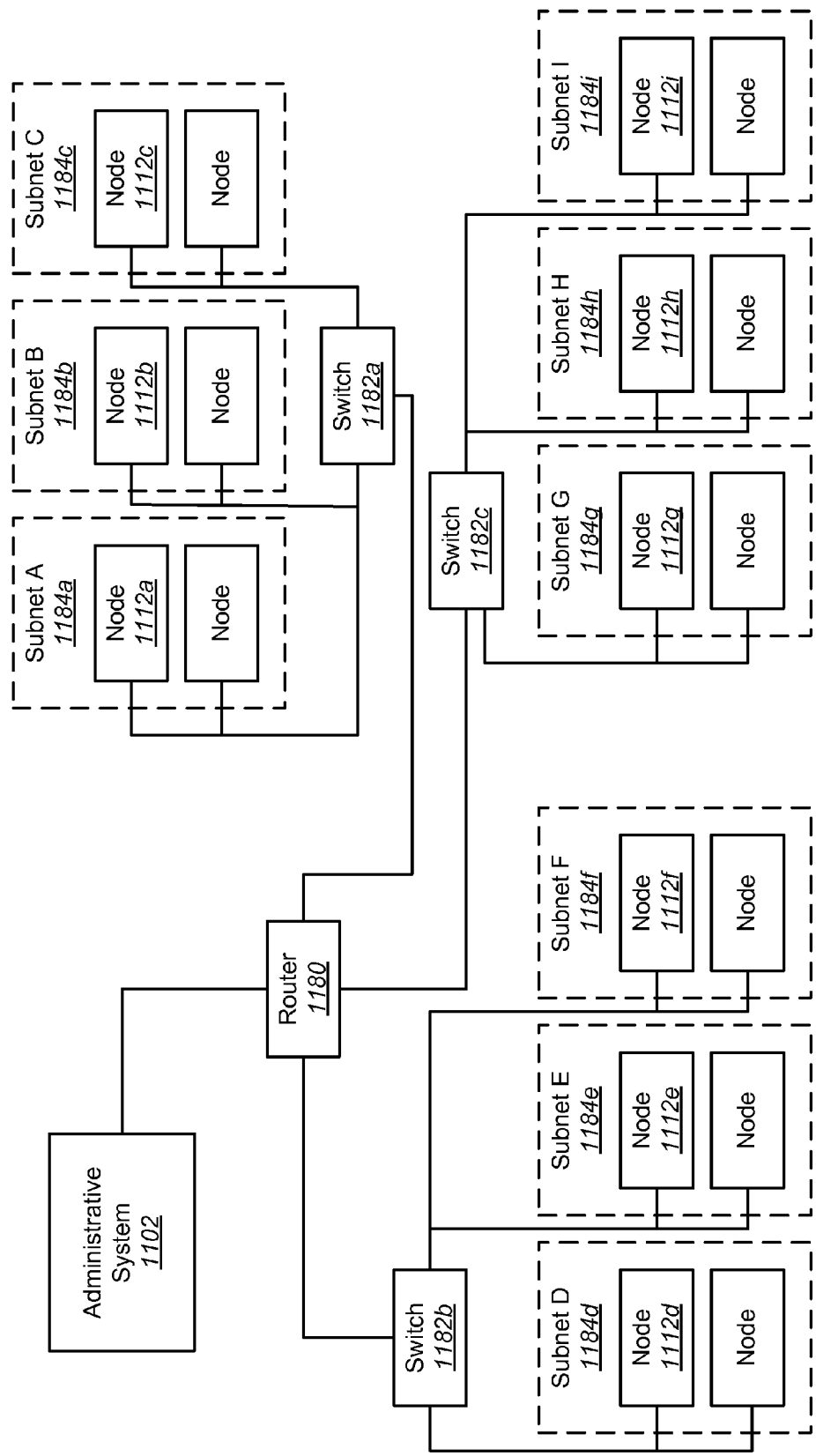
FIG. 11 is a block diagram that illustrates one configuration of a network where a system for controlling processor usage on a computing device may be implemented.

FIG. 11 is a block diagram that illustrates one configuration of a network where a system for controlling processor usage on a computing device may be implemented. An administrative system 1102 is connected to a router 1180. The router 1180 is connected to switches 1182a, 1182b, 1182c. The switch 1182a is connected to several nodes 1112a, 1112b, 1112c, etc. via their respective subnets 1184a, 1184b, 1184c. The switch 1182b is connected to several nodes 1112d, 1112e, 1112f, etc. via their respective subnets 1184d, 1184e, 1184f. The switch 1182c is connected to several nodes 1112g, 1112h, 1112i, etc. via their respective subnets 1184g, 1184h, 1184i. Although FIG. 11 only shows one router 1180, and a limited number of switches 1182, subnets 1184, and nodes 1112, many and varied numbers of routers 1180, switches 1182, subnets 1184, and nodes 1112 may be included in networks and/or systems where a system for controlling processor usage on a computing device may be implemented.

The administrative system 1102 may include an authentication server 116, a proxy server 114, or both. The authenticator 112 may be implemented in a switch 1182 or a router 1180. The nodes 1112 may be requesting nodes 102 and may include a supplicant 106, token injector 108, or both.

Figure 12:
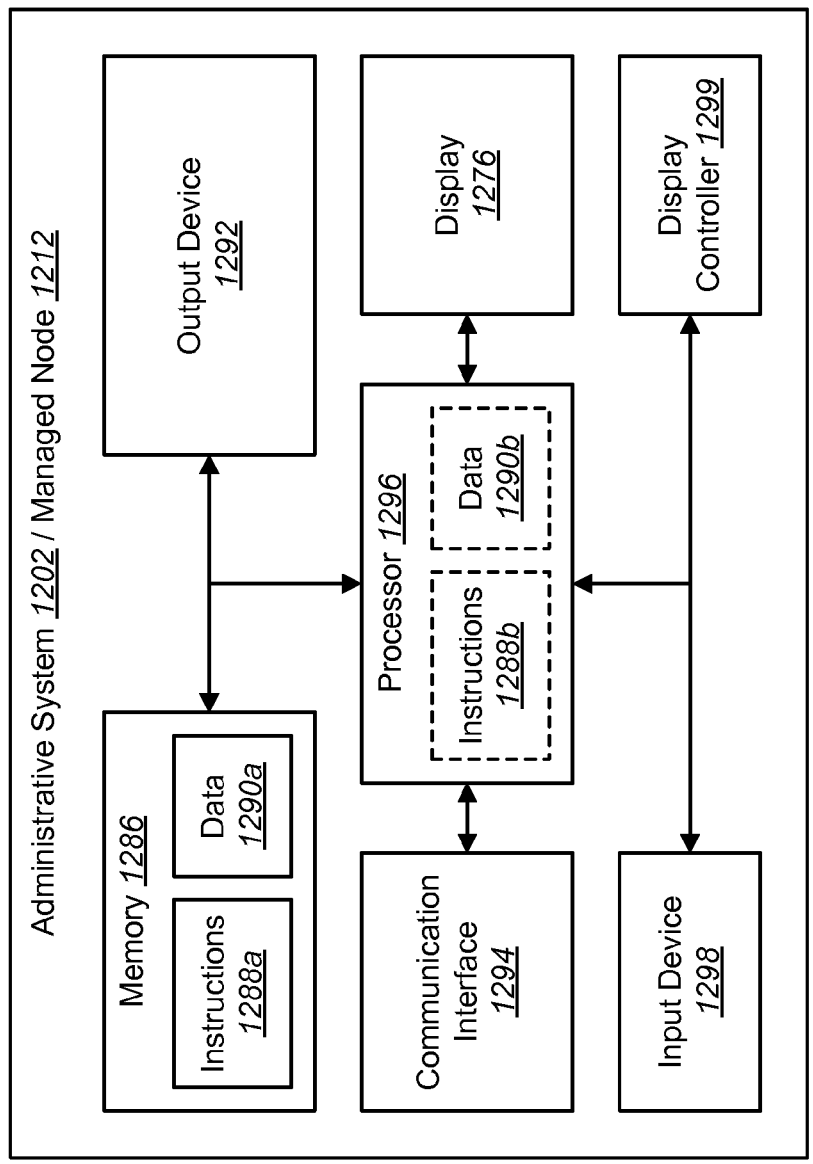
FIG. 12 illustrates various components of a computing device.

FIG. 12 illustrates various components that may be utilized in an administrative system 1202 and/or a managed node 1212. The illustrated components may be located within the same physical structure or in separate housings or structures.

The administrative system 1202 and/or a managed node 1212 may implement an authentication server 116, a proxy server 114, an authenticator 112 or a requesting node 102.

The administrative system 1202 and/or managed node 1212 may include a processor 1296 and memory 1286. The memory 1286 may include instructions 1288a and data 1290a. The processor 1296 controls the operation of the administrative system 1202 and/or managed node 1212 and may be, for example, a microprocessor, a microcontroller, a digital signal processor (DSP) or other device known in the art. The processor 1296 typically performs logical and arithmetic operations based on program instructions 1288b and/or data 1290b stored from the memory 1286.

The administrative system 1202 and/or managed node 1212 typically may include one or more communication interfaces 1294 for communicating with other electronic devices. The communication interfaces 1294 may be based on wired communication technology, wireless communication technology, or both. Examples of different types of communication interfaces 1294 include a serial port, a parallel port, a Universal Serial Bus (USB), an Ethernet adapter, an IEEE 1294 bus interface, a small computer system interface (SCSI) bus interface, an infrared (IR) communication port, a Bluetooth wireless communication adapter, and so forth.

The administrative system 1202 and/or managed node 1212 typically may include one or more input devices 1298 and one or more output devices 1292. Examples of different kinds of input devices 1298 include a keyboard, mouse, microphone, remote control device, button, joystick, trackball, touchpad, lightpen, etc. Examples of different kinds of output devices 1292 include a speaker, printer, etc. One specific type of output device which may be typically included in a computer system is a display device 1276. Display devices 1276 used with configurations disclosed herein may utilize any suitable image projection technology, such as a cathode ray tube (CRT), liquid crystal display (LCD), light-emitting diode (LED), gas plasma, electroluminescence, or the like. A display controller 1299 may also be provided, for converting data stored in the memory 1286 into text, graphics, and/or moving images (as appropriate) shown on the display device 1276.

Of course, FIG. 12 illustrates only one possible configuration of an administrative system 1202 and/or managed node 1212. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for injecting a security token into an authentication protocol response, comprising:
    configuring at least one processor to perform the functions of:
    intercepting the authentication protocol response sent from a node requesting access to a network after receiving, at said node, a request/identity message from an authenticator;
    determining, at the node requesting access to the network, if the node complies with a health policy of the network;
    inserting a security token by the access requesting node into the authentication protocol response based on the compliance of the node, wherein a value within the security token indicates whether the node complies with the health policy; and
    forwarding said inserted authentication protocol response to the authenticator that restricts communications between the access requesting node and an authentication server in the network.

2. The method of claim 1, wherein the inserting comprises unconditionally inserting the security token.

3. The method of claim 2, further comprising allowing the node to unconditionally send the authentication protocol response with the security token to an authenticator.

4. The method of claim 1, wherein the inserting comprises conditionally inserting the security token only if the node complies with the health policy.

5. The method of claim 4, further comprising allowing the node to send the authentication protocol response to an authenticator only if the security token is inserted.

6. The method of claim 4, further comprising terminating an authentication process if the node does not comply with the health policy.

7. The method of claim 1, wherein the authentication protocol response is an Extensible Authentication Protocol (EAP) response.

8. A computing device that is configured for injecting a security token into an authentication protocol response, comprising:
    a processor;
    memory in electronic communication with the processor;
    instructions stored in the memory, the instructions being executable to:
    intercept the authentication protocol response sent from a node requesting access to a network after receiving, at said node, a request/identity message from an authenticator;
    determine, at the node requesting access to the network, if the node complies with a health policy of the network;
    insert a security token by the access requesting node into the authentication protocol response based on the compliance of the node, wherein a value within the security token indicates whether the node complies with the health policy; and
    forwarding said inserted authentication protocol response to the authenticator that restricts communications between the access requesting node and an authentication server in the network.

9. The computing device of claim 8, wherein the instructions executable to insert comprise instructions executable to unconditionally insert the security token.

10. The computing device of claim 9, further comprising instructions executable to allow the node to unconditionally send the authentication protocol response with the security token to an authenticator.

11. The computing device of claim 8, wherein the instructions executable to insert comprise instructions executable to conditionally insert the security token only if the node complies with the health policy.

12. The computing device of claim 11, further comprising instructions executable to allow the node to send the authentication protocol response to an authenticator only if the security token is inserted.

13. The computing device of claim 11, further comprising instructions executable to terminate an authentication process if the node does not comply with the health policy.

14. The computing device of claim 8, wherein the authentication protocol response is an Extensible Authentication Protocol (EAP) response.

15. A non-transitory tangible computer-readable medium for injecting a security token into an authentication protocol response comprising executable instructions for:
   intercepting the authentication protocol response sent from a node requesting access to a network after receiving, at said node, a request/identity message from an authenticator;
   determining, at the node requesting access to the network, if the node complies with a health policy of the network;
   inserting a security token by the access requesting node into the authentication protocol response based on the compliance of the node, wherein a value within the security token indicates whether the node complies with the health policy; and
   forwarding said inserted authentication protocol response to the authenticator that restricts communications between the access requesting node and an authentication server in the network.

16. The computer-readable medium of claim 15, wherein the instructions for inserting comprise instructions for unconditionally inserting the security token.

17. The computer-readable medium of claim 16, further comprising executable instructions for allowing the node to unconditionally send the authentication protocol response with the security token to an authenticator.

18. The computer-readable medium of claim 15, wherein the instructions for inserting comprise instructions for conditionally inserting the security token only if the node complies with the health policy.

19. The computer-readable medium of claim 18, further comprising executable instructions for allowing the node to send the authentication protocol response to an authenticator only if the security token is inserted.

20. The computer-readable medium of claim 18, further comprising executable instructions for terminating an authentication process if the node does not comply with the health policy.

21. The computer-readable medium of claim 15, wherein the authentication protocol response is an Extensible Authentication Protocol (EAP) response.

22. A method for forwarding an encapsulation protocol access request, comprising: configuring at least one processor to perform the functions of:
   receiving at a proxy server the encapsulation protocol access request from an authenticator after the authenticator receives an authentication protocol response from a requesting node;
   determining whether the access request includes a security token that indicates the requesting node has determined whether the requesting node complies with a health policy; and
   forwarding the encapsulation protocol access request to an authentication server based on the determination.

23. The method of claim 22, further comprising:
   if a security token in the access request indicates that a requesting node complies:
      forwarding the encapsulation protocol access request to the authentication server.

24. The method of claim 22, further comprising:
   if a security token is not included in the access request or a security token is included that indicates non-compliance of the requesting node:
      generating an encapsulation protocol access reject message; and
      sending the access reject message to the authenticator.

25. The method of claim 22, further comprising:
   receiving an encapsulation protocol access challenge from the authentication server; and
   forwarding the access challenge to the authenticator.

26. The method of claim 22, wherein the encapsulation protocol access request is a Remote Authentication Dial In User Service (RADIUS) Access-Request message.

27. A computing device that is configured for forwarding an encapsulation protocol access request, comprising:
   a processor;
   memory in electronic communication with the processor;
   instructions stored in the memory, the instructions being executable to:
   receive at a proxy server the encapsulation protocol access request from an authenticator after the authenticator receives an authentication protocol response from a requesting node;
   determine whether the access request includes a security token that indicates the requesting node has determined whether the requesting node complies with a health policy; and
   forward the encapsulation protocol access request to an authentication server based on the determination.

28. The computing device of claim 27, further comprising instructions executable to:
   if a security token in the access request indicates that a requesting node complies:
      forward the encapsulation protocol access request to the authentication server.

29. The computing device of claim 27, further comprising instructions executable to:
   if a security token is not included in the access request or a security token is included that indicates non-compliance of the requesting node:
      generate an encapsulation protocol access reject message; and
      send the access reject message to the authenticator.

30. The computing device of claim 27, further comprising instructions executable to:
   receive an encapsulation protocol access challenge from the authentication server; and
   forward the access challenge to the authenticator.

31. The computing device of claim 27, wherein the encapsulation protocol access request is a Remote Authentication Dial In User Service (RADIUS) Access-Request message.

32. A non-transitory tangible computer-readable medium for forwarding an encapsulation protocol access request comprising executable instructions for:
   receiving at a proxy server the encapsulation protocol access request from an authenticator after the authenticator receives an authentication protocol response from a requesting node;

determining whether the access request includes a security token that indicates the requesting node has determined whether the requesting node complies with a health policy; and forwarding the encapsulation protocol access request to an authentication server based on the determination.

33. The computer-readable medium of claim 32, further comprising executable instructions for:
if a security token in the access request indicates that a requesting node complies:
forwarding the encapsulation protocol access request to the authentication server.

34. The computer-readable medium of claim 32, further comprising executable instructions for:
if a security token is not included in the access request or a security token is included that indicates non-compliance of the requesting node:
generating an encapsulation protocol access reject message; and
sending the access reject message to the authenticator.

35. The computer-readable medium of claim 32, further comprising executable instructions for:
receiving an encapsulation protocol access challenge from the authentication server; and
forwarding the access challenge to the authenticator.

36. The computer-readable medium of claim 32, wherein the encapsulation protocol access request is a Remote Authentication Dial In User Service (RADIUS) Access-Request message.

\* \* \* \* \*